US008195672B2

(12) United States Patent
Monga (10) Patent No.: US 8,195,672 B2
(45) Date of Patent: Jun. 5, 2012

(54) SEARCHING A REPOSITORY OF DOCUMENTS USING A SOURCE IMAGE AS A QUERY

(75) Inventor: Vishal Monga, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 720 days.

(21) Appl. No.: 12/353,393

(22) Filed: Jan. 14, 2009

(65) Prior Publication Data

US 2010/0185615 A1   Jul. 22, 2010

(51) Int. Cl.
*G06F 7/00* (2006.01)
(52) U.S. Cl. .. 707/749; 707/772; 707/780; 707/E17.024
(58) Field of Classification Search .................. 707/736, 707/749, 772, 780
See application file for complete search history.

(56) References Cited

U.S. PATENT DOCUMENTS 5,465,353 A * 11/1995 Hull et al. .............................. 1/1
7,170,933 B2   1/2007 Kouloheris et al.

OTHER PUBLICATIONS

Tong, et al., "No-Reference Quality Assessment for JPEG2000 Compressed Images," Department of Automation, Tsinghau University, Beijing 100084, China, pp. 1-4.
Quality Assessment Algorithm, pp. 1-3, The University of Texas at Austin, © 2002.
Li, "Blind Image Quality Assessment," pp. I-449-I-452, 0-7803-7622-6/02, IEEE 2002.
Sheikh, et al., "No-Reference Quality Assessment Using Natural Scene Statistics: JPEG2000," *IEEE Transactions on Image Processing*, pp. 1-21, Sep. 19, 2004.
Dhillon, et al., "Matrix Nearness Problems using Bregman Divergences," *Householder Symposium XVI*, Seven Springs, PA, pp. 1-61, May 24, 2005.
Vasconcelos, "From Pixels to Semantic Spaces: Advances in Content-Based Image Retrieval," *IEEE Computer Society*, 0018-9162-07, pp. 20-26, © 2007 IEEE.
Marée, et al., "Content-based Image Retrieval by Indexing Random Subwindows with Randomized Trees," pp. 1-31, ACCV, Nov. 22, 2007, Toyko, Japan.
Datta, et al., "Image Retrieval: Ideas, Influences, and Trends of the New Age," *ACM Computing Surveys*, pp. 1-60, vol. 40, No. 2, Article 5, Publication date: Apr. 2008.
Monga, et al., "A Clustering Based Approach to Perceptual Image Hashing," *IEEE Transactions on Information Forensics and Security*, vol. 1, No. 1, pp. 68-79, Mar. 2006.

(Continued)

*Primary Examiner* — John R. Cottingham
*Assistant Examiner* — Nirav K Khakhar
(74) *Attorney, Agent, or Firm* — Philip E. Blair; Fleit Gibbons Gutman Bongini & Bianco P.L.

(57) ABSTRACT

What is disclosed is a system and method for searching a repository of documents containing images using an image as a query. The present method enables the adjustment of a threshold level through a no-reference quality assessment of the query image which produces an estimated measure of quality for the image. For each image in each document in the repository, a distance is computed between a hash value of each image extracted from the document and the hash value of the query image. Documents are flagged as possible matches if the computed distance is less than the adjusted threshold. Documents flagged as a result of the search are retrieved and provided to the user. The present method can be used along or as an adjunct to text-based search techniques. Other embodiments are provided.

12 Claims, 5 Drawing Sheets

OTHER PUBLICATIONS

Monga, et al., "Robust and Secure Image Hashing Via Non-Negative Matrix Factorizations," *IEEE Transactions on Information Forensics and Security*, vol. 2, No. 3, pp. 376-390, Sep. 2007.

"Perceptually Based Method for Robust Image Hashing," Dissertation by Vishal Monga, Department of Eletrical and Computer Engineering, University of Texas at Austin, Austin, Texas, USA, 120 pages, Aug. 2005.

Monga, et al., "Robust Perceptual Image Hashing Using Feature Points," *Proceedings of the IEEE Conference on Image Processing*, 4 pages, (2004).

Monga, et al., "Perceptual Image Hashing Via Feature Points: Performance Evaluation and Trade-Offs," *IEEE Transactions on Image Processing*, vol. 15, No. 11, pp. 3452-3465, Nov. 2006.

Venkatesan, et al., "Robust Image Hashing," *Proceedings of the IEEE Conference on Image Processing*, pp. 664-666, Sep. 2000.

Huttenlocher, et al., "Comparing Images Using the Hausdorff Distance," *IEEE Trans. On Pattern Analysis and Machine Int.*, pp. 850-863, 1993.

U.S. Appl. No. 11/742,020, filed Apr. 30, 2007, Monga.

U.S. Appl. No. 11/851,774, filed Sep. 7, 2007, Monga.

Eakins, et al., "JTAP: Content-based Image Retrieval," *JISC Technology Applications*, University of Northumbria at Newcastle, pp. 1-66, Report 39, Oct. 1999.

Vasconcelos, et al., "A Probabilistic Architecture for Content-based Image Retrieval," *Proceedings IEEE Conference Computer Vision and Pattern Recognition*, Hilton Head, North Carolina, pp. 1-6, 2000.

Lew, "Next-Generation Web Searches for Visual Content," pp. 46-53, 0018-9162, IEEE Nov. 2000.

Sheikh, et al., "Blind Quality Assessment for JPEG2000 Compressed Images," Laboratory for Image and Video Engineering, Department of Electrical and Computer Engineering, The University of Texas at Austin, Austin, Texas 78712-1084, pp. 1-4.

Horita, et al., "No-Reference Image Quality Assessment for JPEG/JPEG2000 Coding," Faculty of Engineering, Toyama University, Toyama 930-8555 Japan, pp. 1301-1304.

Wang, et al., "No-Reference Perceptual Quality Assessment of JPEG Compressed Images," Laboratory for Image and Video Engineering (LIVE), Department of Electrical and Computer Engineering, The University of Texas at Austin, Austin, Texas 78712-1084, pp. 1-4.

\* cited by examiner

SEARCHING A REPOSITORY OF DOCUMENTS USING A SOURCE IMAGE AS A QUERY

TECHNICAL FIELD

The present invention is directed to systems and methods for searching a repository of image-bearing documents using a source image for the search query.

BACKGROUND

Humans have natural abilities involving visual association and more readily recall photos by image content such as a face, scenery, an object such as a car or boat because the brain stores image information as well as, if not better than, text information. Often, a user remembers an image in a document but fails to recall the title of the image or much other information about the document wherein the image was last remembered to be contained within. Method for searching archived images and images within documents are known. Such methods typically associate one or more text strings with an image, such as "1967 Ford Mustang", when the image is archived. The title of an image or sub-text for the image contained within the document is made searchable by an indexing technique. Subsequent text based searches for a matching image in the archival repository would try to return a best match for the query text string used to search for the corresponding image. If the text query used for the search is not correct and no match is found, the user must revise the query string in differing variations until a match is found or until the user determines that the image does not exist in the archive or it simply cannot be found.

Methods have arisen in the art which enable searching for matching images based on image content. However, complications arise from the fact that two images that appear identical may have different digital representations thus making it difficult for automated methods to locate matching images. The query image used for the search may have undergone incidental changes as a result of image processing performed on the image such as color and shading. The query image may have been cropped and/or resized. It may have been rotated, or generated with modified control parameters such as a higher or lower contrast ratios and the like. Content within the image may have been manually or electronically edited or removed. Generally, images go through several operations which tend to introduce distortional differences making the present image different from the original image. As such, the original image is now different from the version of the image contained in one of the document in the repository. Conversely, the query image may be in good shape or may be the original image and the distorted image is the one embedded in a document or stored in an image archive. Searching such an archive or a repository of image-bearing documents for a match between an original image and a distorted image is a difficult problem in this art.

Accordingly, what is needed in this art are increasingly sophisticated systems and methods for querying a repository of image-bearing documents using a source image as a query which is robust against perceptually acceptable distortional differences and which can be used as an adjunct to text-based search queries.

BRIEF SUMMARY

What is disclosed is a novel system and method for searching a repository of documents containing images using a source image as a query. Two embodiments are disclosed. The present method is robust against perceptually acceptable distortional differences between the source query image and the target image intended to be found in a document. The present method can be used alone or as an adjunct to text-based search techniques widely used to query documents. The present method is computationally efficient and readily scalable as additional image-bearing documents are added to the repository.

In a first embodiment, the present method involves the following. An image is obtained which is to be used to search a repository of documents for one or more documents containing an image matching the query image I*. The query image is hashed to obtain a hash value hash value $h(I^*)$ for the query image using an image hash function. An initial threshold level $\tau_0$ is set by the user based on a visual examination of the query image. A tolerance level $\tau$ is then calculated for the search as follows: $\tau=\tau_0+f(D)$, where $f(D)$ is a non-negative and monotonically increasing function of a measure of distortion D, where $0 \leq D \leq D_{max}$. The repository of documents is then searched in an iterative manner as follows. For each document contained in the repository, an initial determination is made whether the document contains any images. For each image in the current document, the image $I^k$ is extracted and hashed using the image hashing algorithm. This produces a hash value $h(I^k)$ for the extracted image. A distance is computed between the hash value of the extracted image and the hash value of the query image. The computed distance is compared against the tolerance level. A document is flagged as a possible match for the query image if the distance is less than the tolerance level. An index of the flagged document is temporarily stored such that the flagged document can be retrieved for the user at a later point. The process repeats for the current document until there are no more images contained therein or until the current document has been flagged as containing an image which is a possible match for the query image. The process repeats for all image-bearing documents in the repository. Upon completion, flagged documents are retrieved and provided to the user in response to the query. The user can thereafter visually examine the retrieved documents.

In a second embodiment, an image is obtained which is to be used to search a repository of documents for one or more documents containing an image matching the query image I*. The query image is hashed to obtain a hash value hash value $h(I^*)$ for the query image using an image hash function. An initial threshold level $\tau_0$ is set by the user based on a visual examination of the original image. An estimated measure of quality $Q(I^*)$ is determined for the query image using a no-reference quality assessment on the query image. The estimated measure of quality is then adjusted (upward or downward) by the initial threshold to obtain an adjusted threshold $\epsilon$ for this search where $[Q(I^*) \pm \tau_0] \rightarrow \epsilon$. The adjusted threshold defining a possible match for the query image. The repository of documents is then searched in an iterative manner as follows. For each document in the repository, an initial determination is made whether the document contains any images. If so then, for each image in this document, the image $I^k$ is extracted and hashed using the hashing algorithm to obtain a hash value $h(I^k)$ for the extracted image. A distance is computed between the hash value of the extracted image and the hash value of the query image. The distance is then compared to the adjusted threshold. A document is flagged as a possible match for the query image if the distance is less than the adjusted threshold. The process repeats for the current document until there are no more images contained therein or until the current document has been flagged as containing an image which is a possible match for the query image. The process repeats for all image-bearing documents in the repository. Upon completion, flagged documents are retrieved and provided to the user in response to the query.

In yet another embodiment, a delta value (or "closeness" factor) is further computed for each document flagged as a possible match. The delta value is computed as a numerical different between the computed distance and the adjusted threshold level for the current extracted image which precipitated a flagging of the current document. Upon completion of the search, flagged documents are sorted for the user according to their respective delta values. The documents are then provided to the user in their sorted order in response to the query.

In another embodiment, a user sets a search termination threshold (or "best match" factor) for the query image. The termination threshold is an amount less than the adjusted threshold. When a document is flagged, the computed distance is then additionally compared against the termination threshold. In response to the distance being less than the termination threshold, the current document is flagged as a "best match" and the search terminates. The user is then provided with the current document in response to the query. The user may further be provided with other documents having already been flagged as possible matches. Other features, enhancements, and embodiments are provided.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for searching a repository of documents containing images using a source image as a query. The repository is iteratively searched for documents containing an image which is a possible match for the query image. Documents flagged as containing a matching image are retrieved for the user in response to the query.

It should be understood that one of ordinary skill in this art would be readily familiar with many facets of document searching techniques and methods which include hash functions, hashing, hamming distances, and the like known in the arts. One of ordinary skill in this art would also be knowledgeable about computer science and software and programming systems and methods sufficient to implement the functionality and capabilities described herein in their own computing environments without undue experimentation.

A hash function, as used herein, refers to a function which takes a large digital object as an input and returns a much shorter binary string as a result. The resultant binary string often serves as an index into a hash table (or array). The returned value is called a hash value, a hash code, a hash sum, or simply a hash. Hash functions are widely used in conjunction with hash tables to quickly locate a record given a search key (headword). The hash function maps the search key to a slot in the table wherein the corresponding record is stored or wherein information about the real location of the corresponding record can be retrieved. A hashing function may map different search keys to the same value. Each slot of a hash table typically contains (implicitly or explicitly) a set of records rather than a single record. For this reason, each slot of the hash table is often called a bucket, and hash values are also referred to as bucket indices. A good hash function will typically narrow a search to a relatively few table entries. Hash functions are widely known and are related to checksums, randomizing functions, error correction codes, and cryptographic hashes. Although these concepts overlap, each has its own uses, benefits, advantages, and requirements.

A repository of documents (or document repository) refers to a collection of documents. Such repositories are well known in the art. The best known methods for searching document repositories include providing a query text phrase and hashing it using hash functions as described above and looking for matches with the text in the documents in the repository. The relevant documents to the query are identified and sorted by the number of hash value matches.

Figure 1:
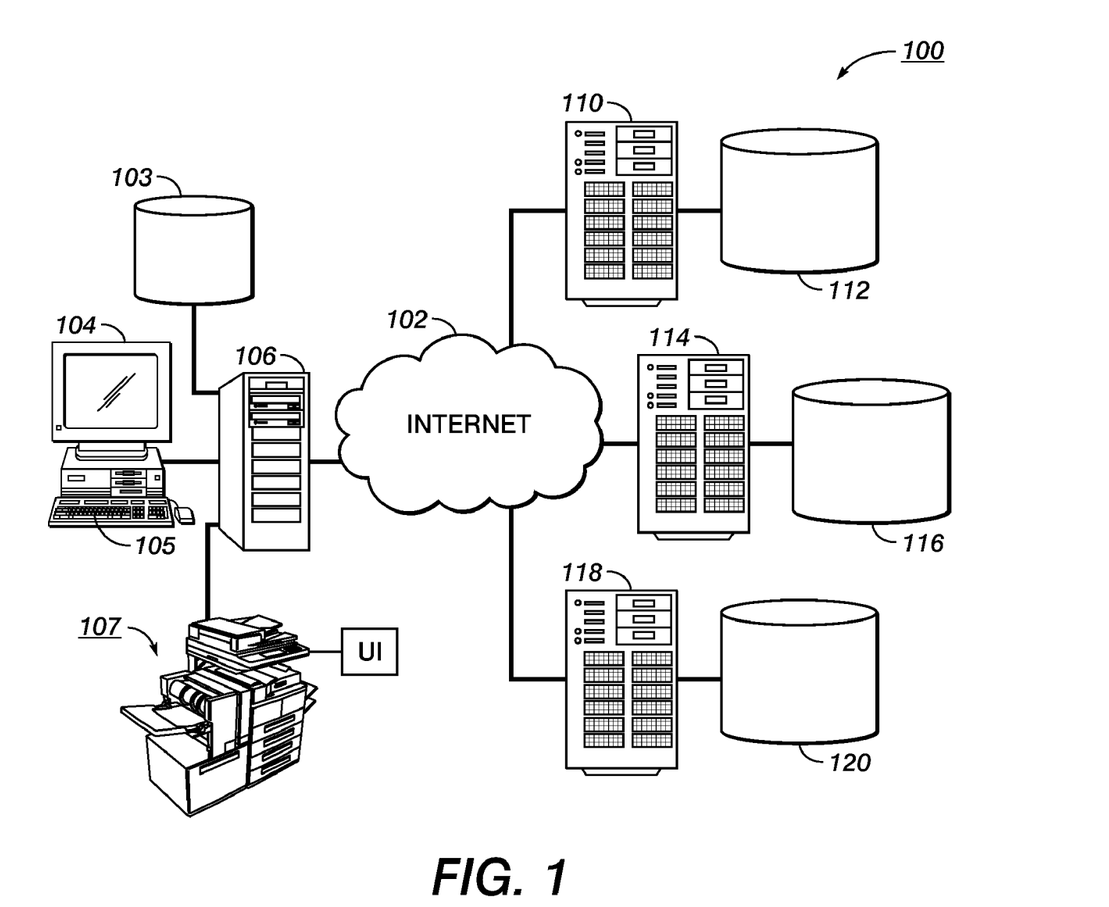
FIG. 1 illustrates one embodiment of an example network that provides connectivity between an example workstation and a plurality of repository servers wherein the present method will likely find its intended uses.

Reference is now being made to FIG. 1 which is a diagram of one embodiment of an example network that provides connectivity between an example workstation and a plurality of document repository servers wherein one or more embodiments of the present method will likely find their intended uses.

In the example embodiment, a network 102 provides connectivity between workstation 106 in communication with a plurality of document repository servers 110, 114, and 118. Workstation 106 is configured with a display device 104, a keyboard/mouse 105, printing device 107, and a local image database 103 for local storage and retrieval of query images. Document repository server 110 with image-bearing document repository 112, repository server 114 with image-bearing document repository 116, and server 116 with document repository 118, each service search requests from workstation 106 or from a remote device (not shown) in communication therewith over network 102. Workstation 106 allows a user to initiate a search request to any of the repository servers which, in turn, search their respective document repositories for documents containing images which are found to possibly match the query image. When an image contained in one or more documents is found to match the source image used as the query image, in a manner as defined herein, the document(s) containing the matching image are retrieved by their servers and provided to the user in response to the query. The user can then visually inspect the one or more documents retrieved as a result of the search. Alternatively, the user modifies the search criteria by selecting another image or modifies the threshold level in a manner further described herein. Optionally, user may also obtain or otherwise receive the query image by using a scanning function of print device 107 and initiate a search of the document repositories for documents containing the scanned image. The query image can be stored locally or obtained from a storage media or from network 102.

In one example embodiment, the documents contained in the document repository contains documents stored in Portable Document Format (PDF). PDF is a file format created by Adobe Systems for document exchange. PDF is used for representing two-dimensional documents in a manner independent of the application software, hardware, and operating system. Each PDF file encapsulates a complete description of a fixed-layout 2-D document (and, with Acrobat 3-D, embedded 3-D documents) that includes the text, fonts, images, and 2-D vector graphics which comprise the documents. PDF is an open standard published July 2008 as ISO 32000-1:2008. See: *PDF Reference Version 1.6 (5th Edition)* by Adobe Systems, Inc., Adobe Press, (January 2005) ISBN-10: 0321304748; ISBN-13: 978-0321304742.

In another embodiment, the documents in the document repository are stored in a PostScript format. PostScript is a page description language run in an interpreter to generate an image, a process requiring many resources. PDF is a file format, not a programming language, i.e. flow control commands are removed, while graphics commands remain. Often, the PostScript-like PDF code is generated from a source PostScript file. The graphics commands that are output by the PostScript code are collected and tokenized; any files, graphics, or fonts to which the document refers also are collected. Then, everything is compressed to a single file. The entire PostScript world (fonts, layout, measurements) remains intact. PDF contains tokenized and interpreted results of the PostScript source code, for direct correspondence between changes to items in the PDF page description and changes to the resulting page appearance.

Each of the computing devices 106, 110, 114, and 118, includes a processor for executing machine readable program instructions. The processor is in digital communication with a main memory for storing data which may include RAM, DRAM, and the like. The computing devices each further includes a hard drive and a removable storage unit capable of reading/writing to a storage media such as a floppy disk, magnetic tape, optical disk, CD-ROM, DVD, etc. Each of the computing devices further includes an internal network interface capable of sending information to and receiving information from network 102 through, for example, an Ethernet card or similar network interface card. Network interfaces include general purpose systems such as POTS (plain old telephone system) and integrated services digital network (ISDN) as well as special purpose systems such as a local area network (LAN) or wireless area network (WAN). Those of ordinary skill will readily appreciate that a networked computing environment capable of performing the method hereof can occur on a variety of environments other than the configuration of FIG. 1.

Many aspects of the network 102, illustrated as an amorphous cloud, are known. Thus a further discussion as to the workings of the network 102 have been omitted. Generally, data packets are transmitted over a network by servers connected via a plurality of communication links in the form of signals which may be, for example, electrical, electronic, electro-magnetic, optical, or other signals. These signals are transmitted by wire, cable, fiber optic, phone line, cellular link, RF, satellite, or any others known in the arts. Computing devices communicate with other computing devices using well established protocols which are beyond the scope of this discussion.

Figure 2A:
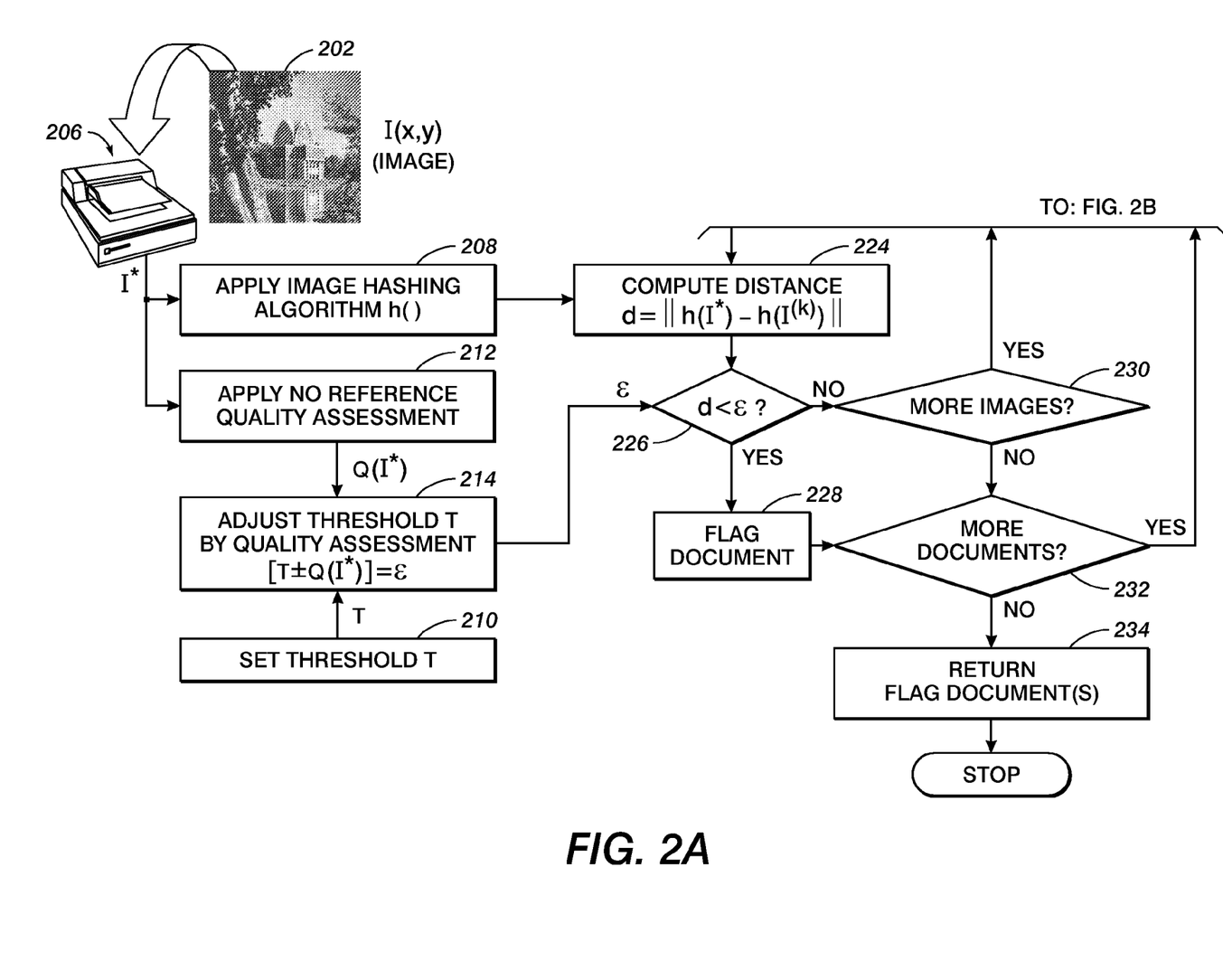
FIGS. 2A-B collectively illustrate one example flow diagram of the present method for searching a repository of image-bearing documents using a query image.
Figure 2B:
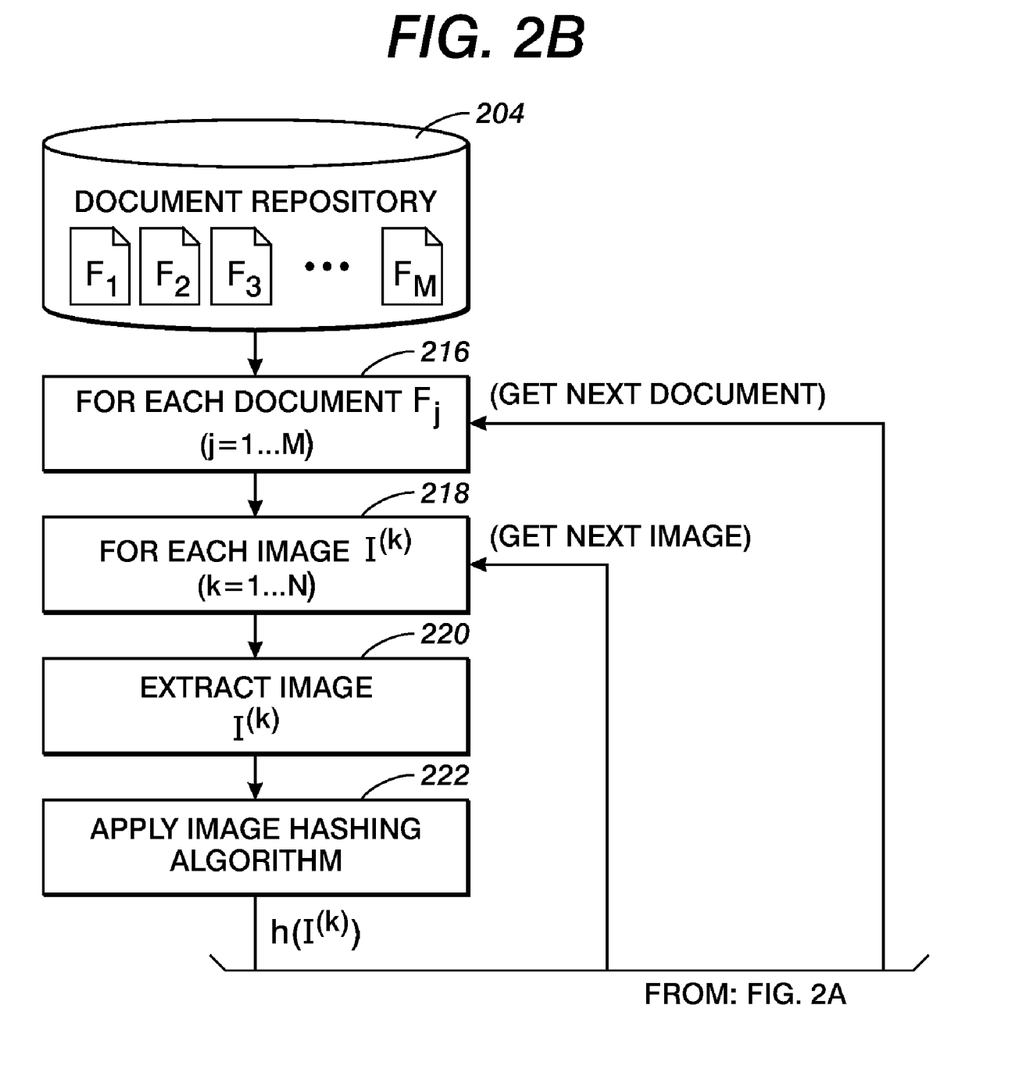

Reference is now being made to the flow diagram of FIGS. 2A-B which collectively illustrate one example embodiment of the present method for searching a repository of image-bearing documents based on a query image.

In one example embodiment, the present method involves the following. A query image 202 is received with which a repository of image-bearing documents 204 will be searched for an image which is a possible match for the query image. The query image can be obtained from a variety of image production sources. In one embodiment, the query image is scanned using scanning device 206 which produces a digitized result of the query image. Alternatively, the query image is retrieved from local image repository 103 of FIG. 1. Once the query image has been obtained or otherwise retrieved, at 208, an image hash function is applied to the query image I*. The application of the image hash function to the digitized image produces a hash value h(I*) for the query image. An image hash function is a hashing technique which maps data represented by an image to a binary string. The mapping is based on the image's appearance to the human eye. Such an image hash function should take into account the changes in the visual domain and produce hash values based on the image's visual appearance. The use of an image hashing function helps make the search robust against perceptually acceptable distortions.

One example image hash function is the perceptual image hash function. A perceptual image hash function has the property that two images that look the same to the human eye map to the same hash value, even if the images have different digital representations. One such perceptual image hashing function is disclosed in "*Robust Perceptual Image Hashing Using Feature Points*", V. Monga and B. L. Evans, Proc. IEEE Conf. on Image Processing, (2004) which is incorporated herein in its entirety by reference. Image hashing functions are available for free as part of the Image Hashing Toolbox in MATLAB released Jun. 18, 2006. Such a hash function is useful when the image possibly undergoes incidental changes such as compression and format changes, common signal processing operations, scanning or watermarking, and the like. Other methods are known. For example, see: "*Perceptually Based Method for Robust Image Hashing*", Dissertation by Vishal Monga, Dept. of Electrical and Computer Engineering, University of Texas at Austin, Tex., USA (August 2005), which is incorporated herein in its entirety by reference. See also: "Robust and Secure Image Hashing Via Non-Negative Matrix Factorizations", by: V. Monga and K. Mihcak, *IEEE Transactions on Information Forensics and Security*, Vol. 2, No. 3, pp. 376-390, (September 2007); "*Perceptual Image Hashing via Feature Points: Performance Evaluation and Tradeoffs*", by: V. Monga and B. L. Evans, IEEE Transactions on Image Processing, Vol. 15, No. 11, pp. 3452-3465, (November 2006); and "*A Clustering Based Approach To Perceptual Image Hashing*", by: V. Monga, A. Banerjee, and B. L. Evans, *IEEE Transactions on Information Forensics and Security*, Vol. 1, No. 1, pp. 68-79, (March 2006), each of which is incorporated herein in their entirety by reference. See also: "*Robust Image Hashing*", R. Venkatesan, S. M. Koon, M. H. Jakubowski, and P. Moulin, Proc. IEEE Conf. on Image Processing, pp. 664-666, (September 2000), which is incorporated herein in its entirety by reference. Other methods for hashing a query image, and using said hashed result in a manner as provided herein, are intended to fall within the scope of the appended claims.

At 210, an initial threshold level $\tau_0$ is set. The initial threshold level is used to define a possible match of the query image with an image contained in an image-bearing document during the search of repository 204. The initial threshold level can be set by a user based on a visual examination of the query image. For instance, if the query image is of relatively poor quality, as determined by the user, then the initial threshold level may be increased from the default level in order to cast a wider net for more possible matches of the query image retrieved in response to the search. Alternatively, a default value for the initial threshold level is set and the level of the default threshold is determined by conducting repeated searches or is set based on prior knowledge about the query image or the image being searched for.

At 212, a no-reference quality assessment is performed on the query image. The no-reference quality assessment is used to estimate a measure of quality for the query image. A no-reference quality assessment is an algorithm which evaluates one or more quality characteristics of an image without pre-knowledge of the original image under examination. The query image may be the original image or it may be a copy thereof which has one or more distortions introduced therein. The query image may be, for instance, an old grainy image, or may have been cropped or colorized. Using the algorithm, the query image is assessed in terms of quality. The determined quality of the source query image estimates the measure of quality Q for the image. As used herein, the measure of quality of image I* is given by Q(I*) which can be further normalized to have a value in a defined range. One method for estimating a quality of a JPEG image or MPEG video stream without referring to its source is disclosed in U.S. Pat. No. 7,170,933, "Method and System for Objective Quality Assessment of Image and Video Streams", (Jan. 30, 2007) which is incorporated herein in its entirety by reference. Another method, entitled: "*No-Reference Image Quality Assessment For JPEG/JPEG2000 Coding*", by Horita, Arata, and Murai, which is incorporated herein by reference, performs a no-reference quality assessment on a JPEG/JPEG2000 encoding image. JPEG2000 is a standard that provides high compression ratios and uses the Discrete Wavelet Transform (DWT) instead of the Discrete Cosine Transform (DCT), but at higher compression ratios than JPEG. The method is based on the blockiness around the block boundary, the average absolute difference between adjacent pixels within block, and the zero-crossing rate within block. The discrimination of JPEG/JPEG2000 coded image is performed using the information of the blockiness and the average absolute difference between adjacent pixels. Another method, entitled: "*Blind Quality Assessment For JPEG2000 Compressed Images*", by: Hamid R. Sheikh, Zhou Wang, Lawrence Cormack and Alan C. Bovik, makes use of a statistical model for natural images in the wavelet domain to quantify the loss in quality due to quantization of wavelet coefficients. Using this model, features are extracted that capture the quantization process in the wavelet domain. Other methods for performing an no-reference quality assessment on a query image are known and are intended to fall within the scope of the appended claims.

The measure of quality Q can be further mapped to a measure of distortion D such that: $0 \leq D \leq D_{max}$. A tolerance level $\tau$ for the search can be obtained by adjusting the initial threshold level by the measure of distortion D such that: $\tau = \tau_0 + f(D)$, where $\tau_0$ is the initial threshold level, and $f(D)$ is a non-negative and monotonically increasing function of said measure of distortion D. Such functions are well known. In general, a sequence $(S_n)$ is monotonically non-increasing if $S_m \leq S_n$ for all m>n. Similarly, a function $f(x)$ is monotonically non-increasing if $f(x) \leq f(y)$ for all x>y. The obtained tolerance level would then be used for determining whether the computed distance, as is described herein further, is within the determined level for the search. If it is not, then the extracted image is not a match for the query image. If it is within the determined tolerance level for the search then the extracted image can be further examined or the document containing the image flagged as containing an image which is a possible match for the query image.

At 214, the initial threshold level $\tau_0$ is used to adjust (upward or downward) the measure of quality Q for the query image I* to obtain an adjusted threshold level $\epsilon$. In one embodiment, the adjustment of the initial threshold by the quality measure takes the form:

$$[Q(I^*) \pm \tau_0] \rightarrow \epsilon$$

where $\epsilon$ becomes the adjusted threshold level for comparative purposes used to define a possible match for the source query image. The initial threshold level can be added or subtracted from the measure of quality depending on the implementation desired by the user hereof. Other methods for adjusting the initial threshold level by the estimated measure of quality to produce an adjusted threshold level for the search are intended to fall within the scope of the appended claims. Such adjustment methods take the measure of quality and the initial threshold as inputs and produces the adjusted threshold level as an output.

At 216, each document in the repository of documents is then searched using the query image. In one embodiment, the search of the document repository takes the following form. At 218, for each image in each image-bearing document found in the repository, the following are performed. At 220, the current image is extracted from the current document. Tools to extract images from, for example, documents in PDF format are known and available. One such tool, called PDF Image Extraction Wizard, is freely available from the Internet. PDF Image Extraction Wizard is a software tool that will store the extracted pictures as individual image files where they can be subsequently retrieved and provided to an image hash function to obtain the hash value therefore. Another image extraction tool, called PDF Wiz, extracts bitmap images from PDF documents and stores them as individual image files in a variety of formats such as, JPG, GIF, BMP, TIF, PNG, and TGA. The extracted images can then be retrieved and hashed in a manner as provided for herein. The tool can extract all images from the document at once or can extract specific images from desired pages. It can also extract images of certain sizes. PDF Wiz is available for download from the Internet. Other tools capable of extracting an image from a document in forms other than PDF are also well known in the arts and readily available. Such image extraction software functions can be integrated into a search software tool incorporating one or more aspects of the present method such that the images are automatically extracted and provided to an image hashing function.

At 222, the extracted mage $I^k$ is hashed using an image hash function to obtain a hash value $h(I^k)$ for the current image. The extracted image is preferably hashed using the same image hash function as was used to obtain the hash value for the query image. Alternatively, different image hashing algorithms are used.

At 224, a distance is computed between the hash value $h(I^k)$ of the extracted current image $I^k$ and the hash value $h(I^*)$ of the query image I*. In one embodiment, the distance is computed as:

$$d = \|h(I^*) - h(I^{(k)})\|.$$

Other distance functions can be employed. For example, in one embodiment, the distance is a Bregman distance well known in the arts. In an alternative embodiment, the images are hashed into hash values having other forms and a distance is computed therebetween. For example, if values to be compared are strings then a Hamming distance can be used. A Hamming distance is the number of bits which differ between two binary strings. More formally, the distance between two strings A and B is given by: $\Sigma |A_i - B_i|$. Hamming distance can be seen as a Manhattan distance between bit vectors. A Manhattan distance is the distance between two points measured along axes at right angles. In a plane with $p_1$ at $(x_1, y_1)$ and $p_2$ at $(x_2, y_2)$, it is $|x_1-x_2|+|y_1-y_2|$, which can be generalized to higher dimensions. The Manhattan distance can be viewed as a generalization of the $L_m$ distance. Manhattan distance is often used in integrated circuits where wires only run parallel to the X or Y axis. The $L_m$ distance is the generalized distance between two points. In a plane with point $p_1$ at $(x_1, y_1)$ and $p_2$ at $(x_2, y_2)$, it is $(|x_1-x_2|^m+|y_1-y_2|^m)^{1/m}$. It is also referred to as the Minkowski distance. A Euclidean distance is defined as the straight line distance between two points. In a plane with $p_1$ at $(x_1, y_1)$ and $p_2$ at $(x_2, y_2)$, it is $\sqrt{((x_1-x_2)^2+(y_1-y_2)^2)}$. The Euclidean distance is the $L_2$ distance. The Manhattan and Hamming distance is $L_1$ distance. $L_\infty$ distance is $\max(|x_1-x_2|, |y_1-y_2|)$. Alternatively, a Levenschtein distance is used. This distance is defined as: 1) the smallest number of insertions, deletions, and substitutions required to change one string or tree into another; and (2) as $\Theta(m \times n)$ algorithm to compute the distance between strings, where m and n are the lengths of the strings. See also: "*Comparing Images Using The Hausdorff Distance*" by: D. P. Huttenlocher, G. A. Klanderman, and W. J. Rucklidge, IEEE Trans. on Pattern Analysis and Machine Int., pp. 850-863, (1993), which is incorporated herein in its entirety by reference. Other methods for computing a distance between the obtained hash values of two images are intended to fall within the scope of the appended claims.

At 226, the computed distance is then compared against the adjusted threshold. In one embodiment, the comparison distance d being less than adjusted threshold.

At 228, a document is flagged as being a possible match in response to the computed distance being less than the adjusted threshold level. The flagged document is identified for subsequent retrieval upon completion of the search. In one embodiment, once a document has been flagged as containing an image which has been determined to possibly match the query image, no further processing is performed on the current document. At 232, a determination is made whether further documents remain to be processed. If so, then processing proceeds with respect to step 216 wherein the next document in the repository of documents is identified for processing in accordance herewith. If the computed distance is not less than the adjusted threshold then, at 230, a determination is made whether more images remain to be processed in the current document. If so, then processing continues with respect to step 218 wherein the next image is retrieved from the current document. If not, then processing proceeds with respect to the decision step 232 wherein a determination is made whether further documents require processing. The process repeats for all images in the current document until there are no more images or until the document has been flagged as a possible match. Once all documents have been processed, at 234, flagged documents are retrieved and provided to a user in response to the query. Alternatively, the total number of flagged documents is provided to the user. The user can make a further determination as to which, if any, of the flagged documents he/she desires to be retrieved in response to the completion of the search. Summaries of the flagged documents can be additionally provided to the user. Further, the extracted image in the document which initiated the flagging of the document during the above-described comparison step is provided to the user for a visual examination thereof to determine if the desired document has been found. It should be appreciated that one skilled in the art would readily understand how to "flag" or otherwise identify a document for subsequent retrieval upon completion of the search. On such method, simply employs saving the title of each of the documents to a text file stored locally. Upon completion of the search, the text file is parsed and the titled documents are retrieved from the document repository.

In those instances wherein the user is looking for a specific document which the user recalls contains a specific image but the user cannot recall the name of the document in the repository, then titles and/or summary abstracts of each of the flagged documents can be assembled and provided to the user. The user may then recall the desired document by visually inspecting the displayed document information. The specific document the user was intending to retrieve can then be selected and retrieved by the repository server and provided to the document. Optionally, the user can send one or more of the flagged documents to a printing device for the production of a hardcopy thereof. Optionally, one or more of the flagged documents are provided to a user via an email or text message communication.

In the instance wherein the user is looking for a specific image contained in one of the document in the repository, the user can visually examine any or all of the flagged documents to make a determination as to which document contains the image which best matches the image used for the query. The user can modify the initial threshold level in either direction to broaden or narrow the search in response to the number of flagged document returned by the search and repeat the search for the query image.

In an alternative embodiment hereof, a document is provided to the user for a visual inspection thereof at the time the document is flagged. The user can then, based on a visual inspection of the current extracted image, can then either select to continue the iterative search process or terminate the search.

In yet another embodiment, a delta value is determined for each document flagged as a possible match during the iterative search comparison process. The delta value is determined as being a numerical different between the computed distance and the adjusted threshold. Upon completion of the search, flagged documents are sorted by their respective delta values. Flagged documents are then provided to the user in their sorted order in response to a completion of the search. The delta value provides for a hierarchical "ranking" of the flagged documents identified during the search.

In another embodiment, at the onset of the search the user sets a termination threshold for the search. The termination threshold is in addition to the initial threshold. The termination threshold is used to determine a best match for the query image. When a best match has been found, further search comparisons cease and the search terminates. It should be appreciated that the termination threshold would be a level which is less than the adjusted threshold used to determine possible matches. For each extracted image, if the computed distance is determined to be less than the adjusted threshold, then the distance is additionally compared against the termination threshold. If the distance is less than the termination threshold, a best match for the query image has been located, as determined by the user, and the search terminates. The user is then provided with the current document as a best match. The user may further be provided with other documents which may have been already been flagged as possible matches in response to a completion of the search.

The present method is robust against perceptually acceptable distortional differences between the query image and the target image intended to be found. The present method can be used alone or as an adjunct to text-based search techniques widely used to query large repositories of documents. The present method is quick and computationally efficient and thus scalable as additional image-bearing documents are added to the repository.

Figure 3:
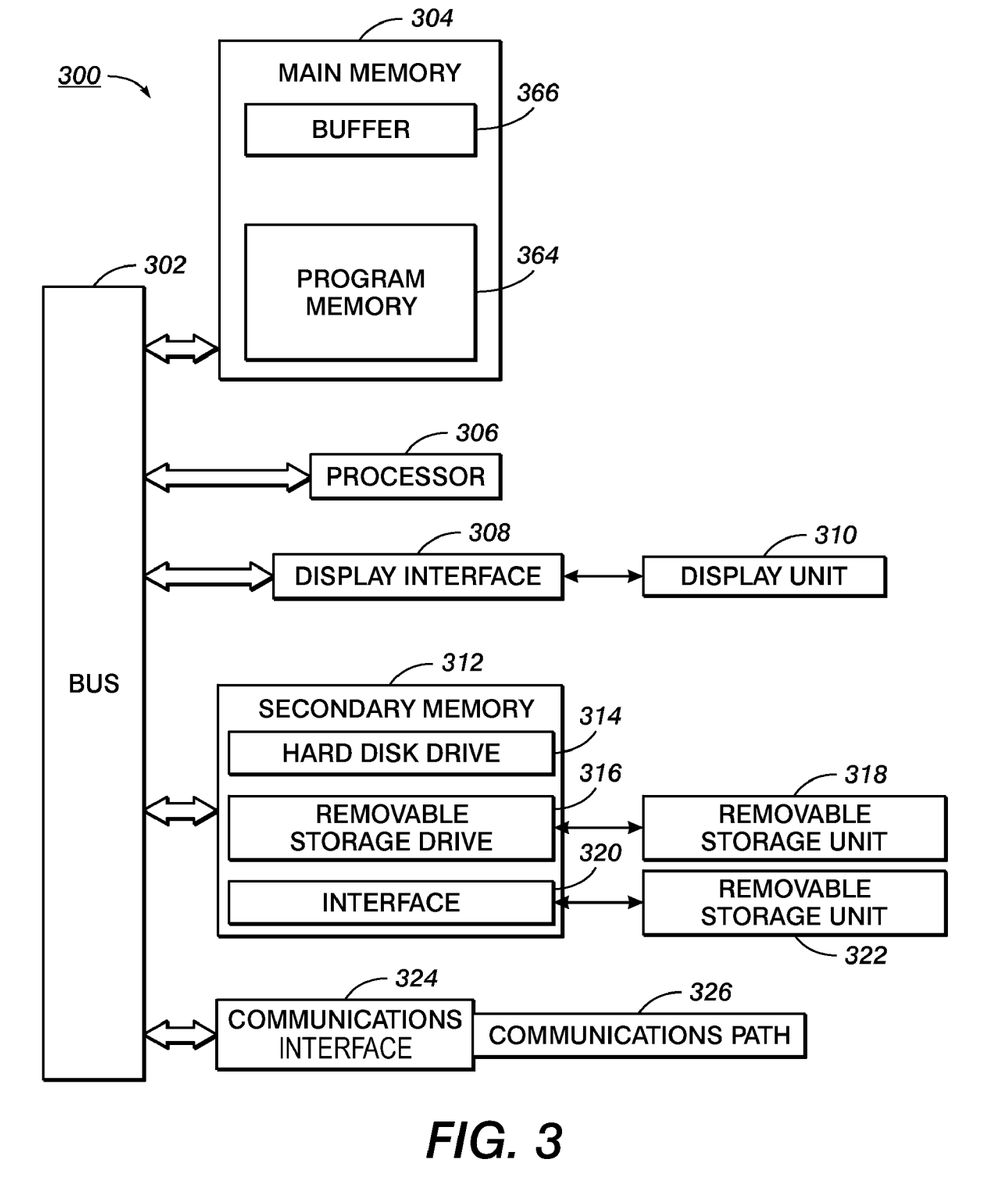
FIG. 3 illustrates a block diagram of one embodiment of a special purpose computer system useful for implementing one or more aspects of the present method.

Reference is now made to FIG. 3 which illustrates a block diagram of one example embodiment of a special purpose computer useful for implementing one or more aspects of the present method. Such a special purpose computer could be implemented as a separate system, or as an electronic circuit, in contained within an ASIC, for example. The nature of the implementation of the special purpose computer will depend on the image processing environment wherein the present method finds its intended uses.

Special purpose computer 300 includes processor 306 for executing machine executable program instructions for carrying out some or all of the present method. The processor is in communication with bus 302. The system includes main memory 304 for storing machine readable instructions. Main memory may comprise random access memory (RAM) to support reprogramming and flexible data storage. Buffer 366 stores data addressable by the processor. Program memory 364 stores program instructions. A display interface 308 forwards data from bus 302 to display 310. Secondary memory 312 includes a hard disk 314 and storage device 316 capable of reading/writing to removable storage unit 318, such as a floppy disk, magnetic tape, optical disk, etc. Secondary memory 312 further includes other mechanisms for allowing programs or other machine executable instructions to be loaded into the processor. Such mechanisms may include, for example, a storage unit 322 adapted to exchange data through interface 320 which enables the transfer of software and data to the processor. The system includes a communications interface 324 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 326 which carries such signals and may be implemented using wire, cable, fiber optic, phone line, cellular link, RF, memory, or other means known in the arts. A scanning device (not shown) for receiving the query image directly from a hardcopy image may be placed in communication the special purpose computer system to obtain a digital rendition thereof. One or more of the steps of the present method, as claimed below and described above, may be encoded in machine readable program instructions and stored in memory or storage. When such machine readable program instructions are loaded by the processor of the special purpose computer system, the instructions are executed to perform the present method.

Figure 4:
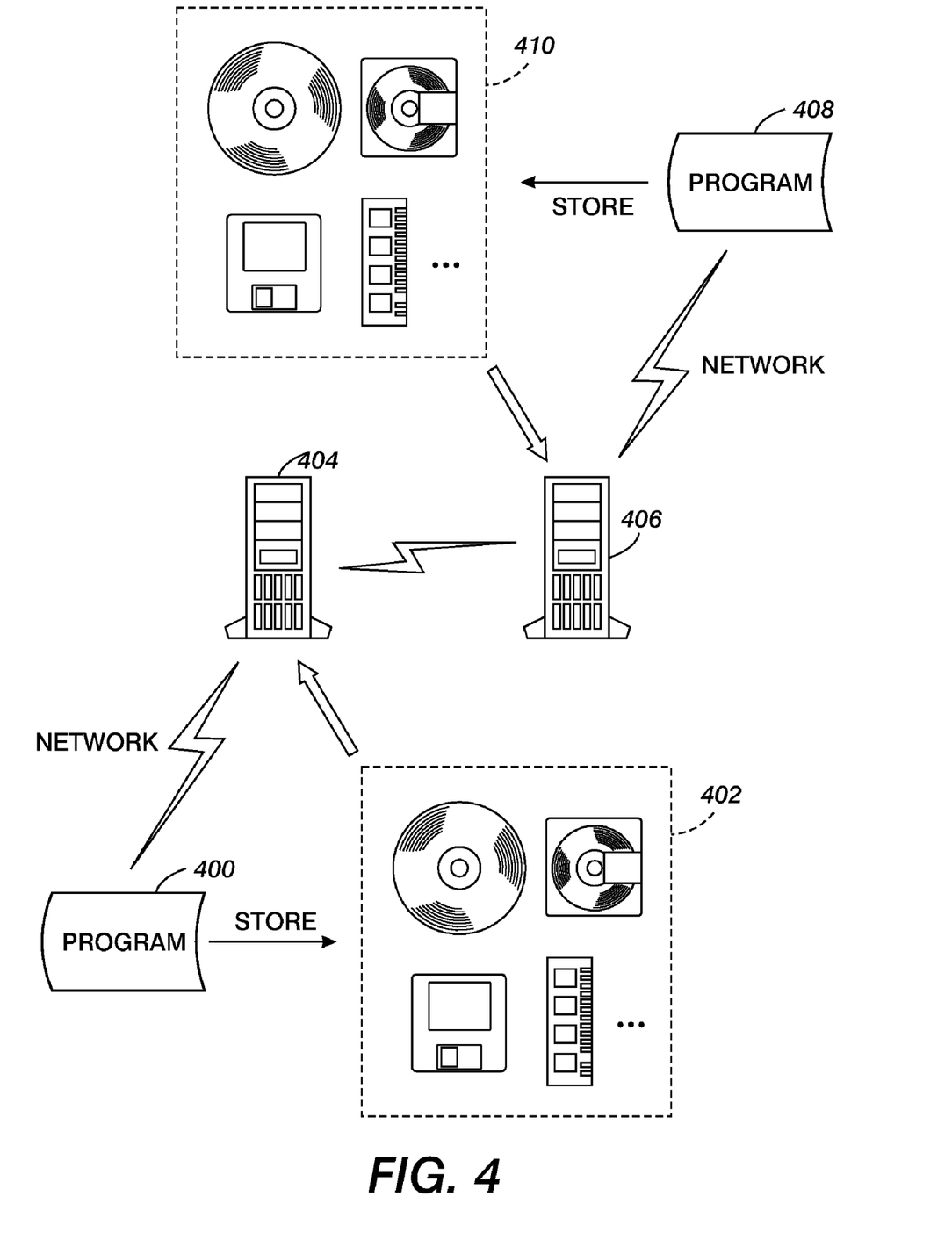
FIG. 4 is an explanatory diagram illustrating one example embodiment of a computer readable medium capable of storing machine readable instructions which, when mounted on a computer or a special purpose computer system, causes the system to perform one or more aspects of the present method.

Reference is now made to FIG. 4 which is an explanatory diagram illustrating one example computer readable storage medium capable of storing machine readable instructions which, when mounted on a computer or a special purpose computer, causes the system to perform one or more aspects of the present method as described above. The machine readable instructions may be modified by one computer and transferred to another computer.

In the illustrated embodiment, one or more computer programs 400 for carrying out the present method are loaded on a computer-readable storage media 402 which includes media such as optical disks (CD-ROM etc.), magnetic disks, magnetic cards, memories (including IC cards and memory card). The storage media stores the machine readable program instructions for sale, transport, and storage by changing magnetic, optical, and/or electric energy states or orientations in response to program instructions having been transferred to the media. The computer programs containing machine executable instructions of the present method can then be mounted on computer 404 and transferred or otherwise communicated to computer 406. The program instructions can then be off-loaded to another medium 408, in original form or modified, including data, and stored on storage media 410. Both of the computer systems include processors capable of executing machine readable program instructions for performing the present method. The processor may be placed in communication with an image scanning device for receiving the source image directly therefrom.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein. Computer readable medium may additionally comprise information in a transitory state medium such as a network link or a network interface which may include a wired network or a wireless network which allows a computer to read such computer readable information.

It should be understood that the flow diagrams hereof are intended to be illustrative. Other operations may be added, modified, enhanced, or consolidated. Variations thereof are intended to fall within the scope of the appended claims.

Embodiments can be implemented in the context of modules. In the computer programming arts, a module can be typically implemented as a collection of routines and data structures that performs particular tasks or implements a particular abstract data type. Modules generally can be composed of two parts. A first software module may list the constants, data types, variable, routines and the like that can be accessed by other modules or routines. A second software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media. It will be appreciated that various of the above-disclosed and other features and functions, or alternatives thereof, may be desirably combined into many other different systems or applications.

It should also be understood that one or more aspects of the present method are intended to be incorporated in an article of manufacture, including computer program products. The article of manufacture may be included on at least one storage device readable by a machine architecture, xerographic, color management, or other processing system capable of executing machine executable program instructions. The article of manufacture may be included as part of a xerographic system, color management system, an operating system, a software program, a plug-in, and the like. The article of manufacture may further be shipped, sold, leased, or otherwise provided either alone or as part of an add-on, update, upgrade, or product suite by the assignee and/or a licensee hereof.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for searching a repository of documents using an image as a search query, the method comprising:
   receiving a query image I* to be used to search a repository of documents;
   using a hash function to hash said query image to obtain a hash value h(I*);
   setting, by a user, an initial threshold level $\tau_0$ for said search, said initial threshold being based upon a visual examination of said query image;
   determining a tolerance level $\tau$ for said search, where $\tau=\tau_0+f(D)$ and $f(D)$ is a non-negative and monotonically increasing function of a measure of distortion D where $0 \leq D \leq D_{max}$, said tolerance level defining a possible match for said search;
   for each document in said repository:
      for each image in said document:
         extracting said image $I^k$ from said document;
         hashing said extracted image to obtain a hash value $h(I^k)$ for said extracted image;
         computing a distance d between said hash value h(I*) and said hash value $h(I^k)$ where $d=\|h(I^*)-h(I^k)\|$;
         comparing distance d against said tolerance level $\tau$; and
         flagging said document as a possible match in response to said distance being less than said tolerance level; and
   providing any of said flagged documents to a user in response to said search.

2. The method of claim 1, further comprising:
   performing a text-based query on said repository of documents; and
   extracting images only from documents matching said text-based query.

3. A computer system for searching a repository of documents using an image as a search query, the system comprising:
   a display device and a user interface for entering an input;
   a memory for storing machine executable instructions;
   a storage device containing a repository of searchable document, at least a portion of said documents contain extractable images; and
   a processor in communication with said display and user interface, said memory and said storage device, said processor executing said machine readable instructions for performing:
      receiving a query image I* to be used to search a repository of documents;
      using a hash function to hash said query image to obtain a hash value h(I*);
      setting, by a user, an initial threshold level $\tau_0$ for said search, said initial threshold being based upon a visual examination of said query image;
      determining a tolerance level $\tau$ for said search, where $\tau=\tau_0+f(D)$ and $f(D)$ is a non-negative and monotonically increasing function of a measure of distortion D where $0 \leq D \leq D_{max}$, said tolerance level defining a possible match for said search;
      for each document in said repository:
         for each image in said document:
            extracting said image $I^k$ from said document;
            hashing said extracted image to obtain a hash value $h(I^k)$ for said extracted current image;
            computing a distance d between said hash value h(I*) and said hash value $h(I^k)$ where $d=\|h(I^*)-h(I^k)\|$;
            comparing distance d against said tolerance level $\tau$; and
            flagging said document as a possible match in response to said distance being less than said tolerance level; and
      providing any of said flagged documents to a user in response to said search.

4. The computer system of claim 3, further comprising:
   performing a text-based query on said repository of documents; and
   extracting images only from documents matching said text-based query.

5. A method for searching a repository of documents using an image as a search query, the method comprising:
   receiving a query image I* to be used to search a repository of documents;
   using a hash function to hash said query image to obtain a hash value h(I*);
   setting, by a user, an initial threshold level $\tau_0$ for said search based upon a visual examination of said query image;
   performing a no-reference quality assessment Q on said query image I* to estimate a measure of quality Q(I*) for said query image;
   using said initial threshold level $\tau_0$ to adjust said estimated measure of quality (upward/downward) to obtain an adjusted threshold level $\epsilon$ where $[Q(I^*) \pm \tau_0] \rightarrow \epsilon$, said adjusted threshold defining a possible match for said search;
   for each document in said repository:
      for each image in said document:
         extracting said current image $I^k$ from said current document;
         hashing said extracted image to obtain a hash value $h(I^k)$ for said extracted image;
         computing a distance d between said hash value h(I*) and said hash value $h(I^k)$ where $d=\|h(I^*)-h(I^k)\|$;
         comparing distance d to said adjusted threshold $\epsilon$; and
         flagging said document as a possible match in response to said distance being less than said adjusted threshold; and
   providing any of said flagged documents to a user in response to said search.

6. The method of claim 5, further comprising:
   determining a delta value for said flagged document, said delta value being a difference between said computed distance and said adjusted threshold; and
   sorting said flagged documents by an order of said delta values.

7. The method of claim 5, further comprising:
setting a termination threshold level with which to define a best match for said search, said termination threshold level being less than said adjusted threshold;
flagging said current document as a best match in response to said computed distance being less than said termination threshold level; and
terminating said search in response to said flagging.

8. The method of claim 5, further comprising:
performing a text-based query on said repository of documents; and
extracting images only from documents matching said text-based query.

9. A computer system for searching a repository of documents using an image as a search query, the system comprising:
a display device and a user interface for entering an input;
a memory for storing machine executable instructions;
a storage device containing a repository of searchable document, at least a portion of said documents contain extractable images; and
a processor in communication with said display and user interface, said memory and said storage device, said processor executing said machine readable instructions for performing:
receiving a query image $I^*$ to be used to search a repository of documents;
using a hash function to hash said query image to obtain a hash value $h(I^*)$;
setting, by a user, an initial threshold level $\tau_0$ for said search based upon a visual examination of said query image;
performing a no-reference quality assessment Q on said query image $I^*$ to estimate a measure of quality $Q(I^*)$ for said query image;
using said initial threshold level $\tau_0$ to adjust said estimated measure of quality (upward/downward) to obtain an adjusted threshold level $\epsilon$ where $[Q(I^*)\pm\tau_0]\rightarrow\epsilon$, said adjusted threshold defining a possible match for said search;
for each document in said repository:
for each image in said document:
extracting said current image $I^k$ from said current document;
hashing said extracted image to obtain a hash value $h(I^k)$ for said extracted image;
computing a distance d between said hash value $h(I^*)$ and said hash value $h(I^k)$ where $d=\|h(I^*)-h(I^k)\|$;
comparing distance d to said adjusted threshold $\epsilon$; and
flagging said document as a possible match in response to said distance being less than said adjusted threshold; and
providing any of said flagged documents to a user in response to said search.

10. The computer system of claim 9, further comprising:
determining a delta value for said flagged document, said delta value being a difference between said computed distance and said adjusted threshold; and
sorting said flagged documents by an order of said delta values.

11. The computer system of claim 9, further comprising:
setting a termination threshold level with which to define a best match for said search, said termination threshold level being less than said adjusted threshold;
flagging said current document as a best match in response to said computed distance being less than said termination threshold level; and
terminating said search in response to said flagging.

12. The computer system of claim 9, further comprising:
performing a text-based query on said repository of documents; and
extracting images only from documents matching said text-based query.

* * * * *